United States Patent [19]

Preus

[11] 4,062,191
[45] Dec. 13, 1977

[54] HIGH FREEBOARD BARRIER CONSTRUCTION FOR WATER CARRIED POLLUTANTS

[76] Inventor: Paul Preus, 21 Smith Road, Toms River, N.J. 08753

[21] Appl. No.: 729,714

[22] Filed: Oct. 5, 1976

[51] Int. Cl.² .............................................. E02B 15/04
[52] U.S. Cl. ................................ 61/1 F; 210/DIG. 25
[58] Field of Search ..................... 61/1 F, 1 R, 3–5; 210/242 S, DIG. 25

[56] References Cited

U.S. PATENT DOCUMENTS

| | | | |
|---|---|---|---|
| 3,067,712 | 12/1962 | Doerpinghaus | 61/1 F UX |
| 3,476,246 | 11/1969 | Dahan | 61/1 F X |
| 3,537,587 | 11/1970 | Kain | 61/1 F X |
| 3,584,462 | 6/1971 | Gadd | 61/1 F |
| 3,592,008 | 7/1971 | Trindle | 61/1 F |
| 3,666,098 | 5/1972 | Garland et al. | 210/DIG. 25 |
| 3,798,913 | 3/1974 | Dubois | 61/1 F |
| 3,800,542 | 4/1974 | Cerasari | 61/1 F |
| 3,852,978 | 12/1974 | Fossberg | 61/1 F |

*Primary Examiner*—Dennis L. Taylor
*Attorney, Agent, or Firm*—Harold L. Stowell

[57] ABSTRACT

A high freeboard barrier for water carried pollutants includes a series of end to end connectable tubular boom sections with each boom section including an upstanding fin and a depending skirt, and further fabric means extending from at least below the water line to substantially above the fin to thereby increase the freeboard of the barrier. The fabric may be fireproof to reduce oil spill fire damage to the barrier. The fabric means may be of the type which extends the length of the skirt or substantially therebelow and the fabric means may be of the add-on type for use with existing barriers.

10 Claims, 4 Drawing Figures

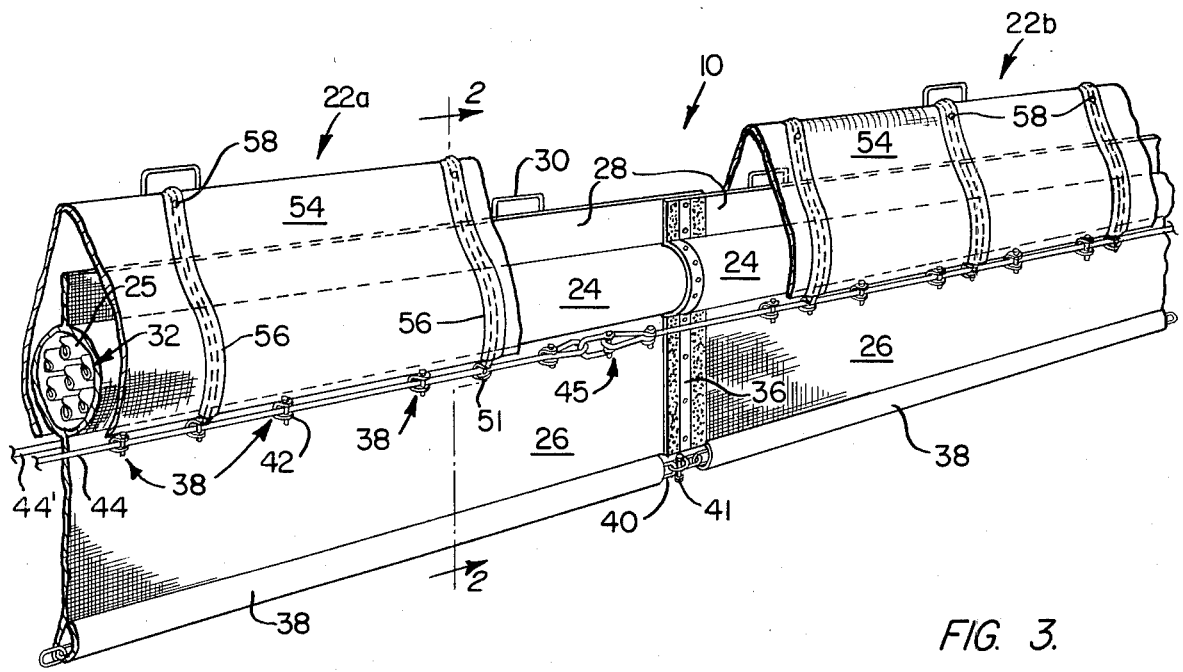
FIG. 1.
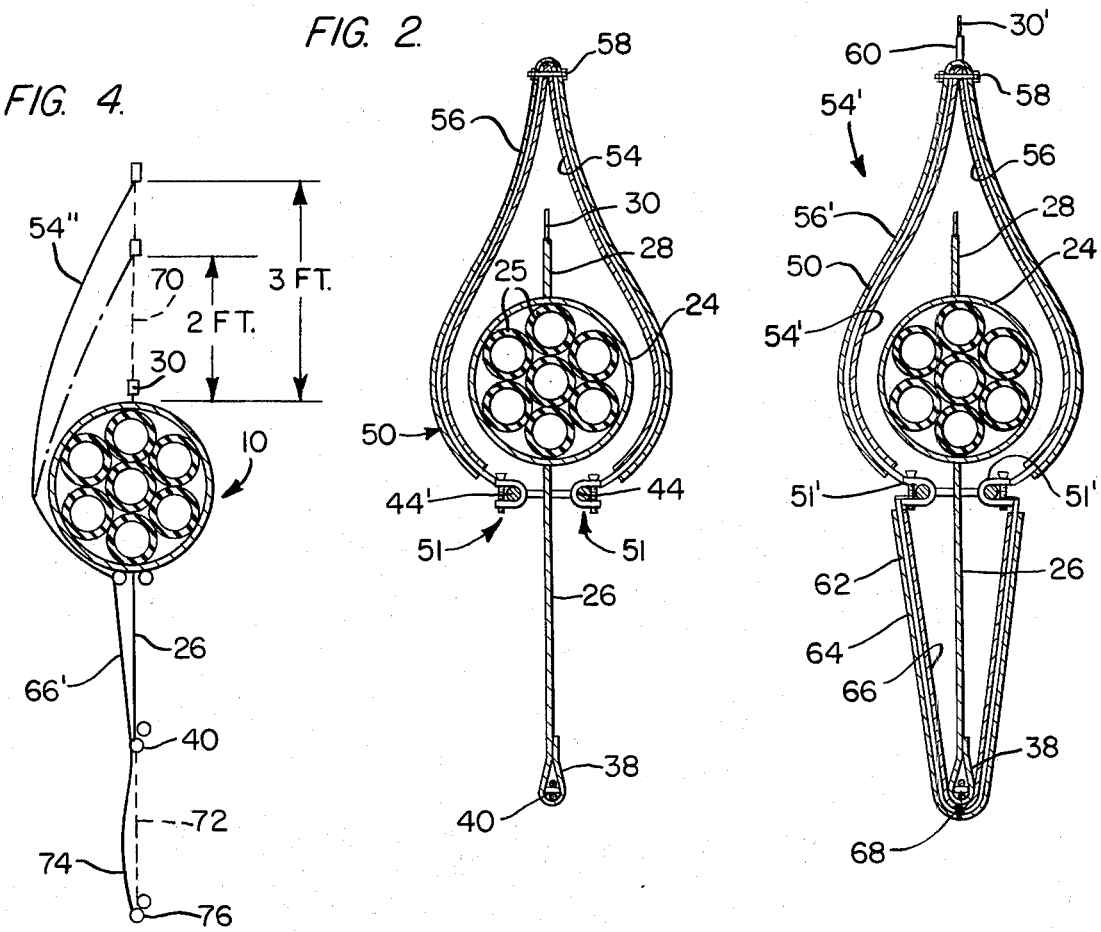
FIG. 2.
FIG. 3.
FIG. 4.

HIGH FREEBOARD BARRIER CONSTRUCTION FOR WATER CARRIED POLLUTANTS

CROSS-REFERENCE TO RELATED APPLICATIONS

Related subject material is disclosed in my U.S. patent application Ser. No. 497,712 filed Aug. 15, 1974 which is a continuation of application Ser. No. 292,886, now U.S. Pat. No. 3,855,152 which is a division of application Ser. No. 83,640 filed Oct. 24, 1970, now abandoned, and Ser. No. 676,795 filed Apr. 14, 1976.

Further related subject matter is disclosed in my U.S. Pat. Nos. 3,849,989; 3,667,235; 3,783,621 and 3,667,225.

BACKGROUND OF THE INVENTION

FIELD OF THE INVENTION

Floating barriers, known generally as oil booms, have been found to have great utility in containing and controlling oil slicks and other water carried pollutants on and in bodies of water. The barriers usually include floatation elements having a depending liquid impervious skirt which, when deployed around or in a controlling position relative to the pollutant, provide means to contain or prevent the pollutant from spreading or moving into uncontaminated areas.

SUMMARY OF THE INVENTION

This invention is directed to a barrier for containing and controlling water carried pollutants, for example, oil wherein the entire barrier is composed of a series of boom sections which are connectable in end to end relationship with each of the boom sections containing a floatation material which, for example, comprises an oleophilic-hydrophobic-lighter than water composition which will selectively absorb and/or adsorb hydrocarbons or other pollutants or the floatation means may comprise air inflatable chambers.

The boom sections are connected to flexible draft members such as cables or chains which maintain the integrity of the boom even if it becomes necessary to replace one or more of the boom sections or to enlarge the area confined by the boom or to decrease such area by removing boom sections. The flexible draft members and associated connectors are employed in the present invention to support an upstanding fabric or plastic or fabric and plastic web which increases the freeboard or the boom. Hereinafter, the term fabric includes within its scope webs of woven material, plastic sheets, plastic coated woven material and the like. Further, as to be more fully described hereinafter, the fabric web may be treated to render it fireproof or it may be constructed of material resistant to burning and the fabric web may extend into the water a distance equal to or greater than the conventional skirt of the boom section, as will be more apparent from the following detailed description. Further, the fabric web may be mounted only on the side of the boom facing the oil spill or on both sides.

The invention will be more fully described in light of the accompanying drawing wherein like components throughout the figures are indicated by like numerals and wherein:

BRIEF DESCRIPTION OF THE DRAWING

FIG. 1 is a fragmentary perspective view of a pair of boom sections of the type wherein each of the floating booms includes a relatively long depending skirt;

FIG. 2 is a section on line 2—2 of FIG. 1;

FIG. 3 is a view like that of FIG. 2 of a modified form of the present invention; and FIG. 4 is a view like that of FIG. 3 of still a further form of the present invention.

DESCRIPTION OF PREFERRED EMBODIMENTS

Referring to FIGS. 1 and 2, 10 generally designates a floating oil containing boom of the invention.

The boom is made up of a plurality or series of boom sections 22a, 22b, etc. Each of the boom sections comprises a generally tubular element 24 and a depending skirt 26. The tubular sections 24 are provided with an upstanding fin 28 provided with hand grips 30 at spaced intervals there along.

The handles or hand grips 30 are useful in deploying and retrieving the boom sections. Further, the handles 30 are also very useful in storing the boom sections as the handles may be merely slipped over pegs spaced at least a pair of handles distance or multiples thereof. The hand grips have also been found to be helpful in cleaning the boom sections prior to reuse as the handles may be hung over hooks movably positioned above a scrub tank.

Within the tubular portions 24 is maintained a suitable floation means material 32 which may comprise the composition described in my U.S. Pat. No. 3,855,152 and my copending application Ser. No. 597,712 filed Aug. 15, 1974, or for example, inflatable chambers 25.

While "Sorbent C" is a useful composition for filling the tubular portions 24, other absorbents and/or adsorbents may be used without departing from the scope of the present invention.

If the cylindrical or tubular portions 24 of the boom sections 22a, 22b, etc. contain a selective oil absorbing and/or adsorbing material, the tubular portions are constructed of liquid pervious material such as mesh, which mesh may be formed of organic and/or inorganic fibers, plastic, metal or combinations thereof and each of the tubular portions 24 is provided with a cylindrical end cover. Where each of the tubular portions 24 of the boom is filled with a non-oil or hydrocarbon absorbent material such as foam plastic, cork or the like or inflatable chambers as illustrated, then the material of construction of such tubular portions would be impervious, and a nylon reinforced, oil resistant fabric has been found to be very satisfactory.

Each of the boom segments 22a, 22b, etc. includes a depending skirt 26, which depending skirt is formed of a fluid impervious material such as sheet plastic or rubber coated fabrics which should be relatively inert to the solvent or softening action of hydrocarbons.

The skirt length is greater than the length of the tubular portion 24 to provide overlapping portions 36 which may be fastened together by suitable separable fasteners, lacings or the like. Further, the lower portion of the skirt is provided with a roll 38 containing a ballast chain or the like 40. The ends of the ballast chain 40, of opposed sections, are connected together by a through bolt 41.

Also as illustrated in FIG. 1, an upstanding fin 28 is provided for the boom, its length in a longitudinal direction is equivalent to the longitudinal length of the depending skirt to also provide overlap fastening ends in a manner like the overlap ends 36 of the skirt 26.

Each tubular sleeve portion 24 has a length of, for example, 50 feet and a diameter of, for example, 8 inches. Each boom section may have a length of from 2 feet to 100 feet and diameters in the range of from 6 inches to as much as 36 inches for example.

Slightly below the tubular portion 24 are provided a plurality of openings which receive resilient grommets sized to snugly receive cable retaining connectors generally designated 38. The extended ends of the connectors 38 are furcated as at 42, which furcations receive a pair of cables 44 and 44', one lying on each side of the entire boom. The cables are maintained in their respective connectors 42 and 42' by locking bolts.

Any suitable form of cables 44 and 44' or chains can be used in the unit; however, in order to insure the integrity of the boom even in rivers which may contain floating debris such as trees, logs, etc., tensile strengths in the order of from about 4,000 to 80,000 pounds is desirable.

Preferably the cables 44 and 44' are provided in lengths of about 50 feet or so and such lengths are jointed end to end and fastened by suitable cable connectors or furcated connectors such as connectors 45.

Through the use of the connector assemblies 38, one or more sections 22a, 22b, etc. may be replaced without distrubing the integrity of the boom.

A plurality of stays or battens are secured at spaced intervals to the pair of cables 44 and 44'. The battens, generally designated 50, have secured at the lower ends thereof cable clamps 51, which cable clamps secure the battens 50 to the pair of cables 44 and 44'.

In the illustrated form of the invention, the cable clamps 51 are shown as being spaced from the clevis ends 42 of the connectors 38. However, where desired, the form of the cable clamps 51 may be modified to enable attachment to the connectors 38 or the connectors may be formed as a part thereof.

Each of the battens 50 is formed of metal, metal coated plastic or the like of sufficient rigidity to support its portionate share of the fabric freeboard extender 54. The fabric freeboard extender 54 is constructed with a plurality of spaced pouches 56 equal in number to the desired number of battens 50. The pouches contain the battens which in turn maintain the desired configuration in the fabric freeboard extender. Where the added height is about 2 feet from the upper surface of the cylindrical portion 24 of the boom, placement of the battens about every two or 2½ feet is satisfactory. For lesser height of freeboard extension, the battens may be spaced a greater distance or, if the freeboard is extended, for example, 48 inches, the battens would be spaced closer together. It is contemplated that the freeboard extension may be as little as 6 inches or as much as about 36 or 48 inches. Thus, batten spacing of from about 6 inches to more than 4 feet are contemplated as being within the scope of the present invention.

For ease of insertion and removal, the battens 50 are preferrably made in two parts and fastened together with a bolt and lock washer 58 where they join at the upper end.

Referring now to FIG. 3, a modified form of the present invention is illustrated wherein the boom structures are identical to those illustrated in FIG. 1, however, the fabric freeboard extender 54' is provided at its upper end with a vertical spoiler 60 which may have secured thereto, at spaced intervals, handles 30' similar in construction to handles 30 connected to the fin 28 of the boom. Utilizing a 4 inch vertical spoiler 60 along the top of the freeboard extending fabric 54 effectively eliminates the "sail affect" of the freeboard extender.

The freeboard fabric extender 54' is secured to the boom via battens or stays 50' having cable clamps or connectors 51' connected to the lower ends thereof. The connectors 51' also support lower battens 62 which are fitted in pouches 64 secured to fabric 66 which protects the depending skirt 26 of the boom in case of an oil fire.

The modified freeboard extender 54' is attached to the battens 50' via pouches 56' stitched to the outer surface of the fabric 54' in a manner like that illustrated in FIGS. 1 and 2. The upper ends of battens 50' are secured together via nut and bolt assemblies 58' and the lower battens 62 are secured at their lower ends by nut and bolt assemblies 68. The height of the freeboard extender 54' may be in the range set forth in reference to the description of the FIGS. 1 and 2 form of the invention.

Referring now to FIG. 4, a modified form of the invention is shown wherein the freeboard extender fabric 54" and the skirt protector 66' are provided only on one side of the boom 10, that is, the side against which the oil pollutant or contaminate is contained. Since the stays or battens supporting the upper end of the fabric extender 54" are only one-sided, additional support therefor is provided by a vertically extending stay 70 having its lower end connected to handle 30 of the boom 10 and its upper end bolted to the half stay. Also illustrated in FIG. 4 is the provision of the fabric protector for the skirt which extends substantially below the ballast chain 40 of the skirt 26 in which case a further batten 72 extends from the ballast chain zone to the lower end 74 of the fabric extender. A further ballast chain 76 is provided at the lower end 74 of the fabric extender.

From the foregoing description, it will be seen that the freeboard extender not only reduce oil slopover in heavy waves or high winds and protects the boom proper from fire damage where the fabric is of a fireproof nature, but also the increased freeboard and lowering of the skirt of the boom forms good channeling surfaces or running surfaces for channeling oil on and/or in the water to a pickup zone. In this latter case where the extender is used as a channel for running oil to a pickup zone, only that portion of the boom proper employed for channeling is provided with the extender.

In order to facilitate insertion and removal of the freeboard extender or fire screen, the fabric 54, 54', 54", 66, 66' and 74 may be made in lengths such as, for example, 10, 20 or so feet and, at the joints between adjacent sections, the fabric extenders may be laced or otherwise fastened together by means of sister hooks or Velcro type securing means.

From the foregoing description of preferred embodiments of the present invention, it will be see that the aims and objects and others are fully accomplished.

I claim:

1. A high freeboard barrier for water carried pollutants comprising a plurality of hollow tubular floatation members each having a depending skirt, cable members extending along each side of the barrier, connector means interconnecting said cables and attaching said cables to the barrier at a plurality of spaced points, a plurality of upstanding spaced apart battens extending along each of said floatation members, means attaching each of said battens to its respective floatation member, and removable auxiliary fabric means supported by said battens and extending from at least below the water line of the barrier to substantially above the tubular floatation member to thereby increase the freeboard of the barrier.

2. The invention defined in claim 1 wherein said auxiliary fabric means extends to the bottom of the depending skirt.

3. The invention defined in claim 1 wherein the auxiliary fabric extends below the lower edge of the depending skirt.

4. The invention defined in claim 1 wherein the auxiliary fabric means extends along both sides of the barrier.

5. The invention defined in claim 1 wherein the auxiliary fabric extends only along one side of the barrier.

6. The invention defined in claim 1 wherein the battens are connected to the cable members extending along each side of the barrier.

7. The invention defined in claim 1 including further batten members extending from said cables to or below the lower end of the depending skirt.

8. The invention defined in claim 1 wherein the auxiliary fabric is fire resistant.

9. The invention defined in claim 1 wherein the upper edge of the auxiliary fabric is provided with a spoiler member.

10. The invention defined in claim 1 wherein the upper edge of the auxiliary fabric means is provided with a longitudinally extending spoiler and said spoiler is provided with a plurality of spaced hand holds.

* * * * *